(12) United States Patent
Shim

(10) Patent No.: US 11,376,818 B2
(45) Date of Patent: Jul. 5, 2022

(54) PAD AND FILM ATTACHING METHOD USING THE SAME

(71) Applicant: Samsung Display Co., Ltd., Yongin-Si (KR)

(72) Inventor: Byoung Yul Shim, Hwaseong-si (KR)

(73) Assignee: Samsung Display Co., Ltd.

( * ) Notice: Subject to any disclaimer, the term of this patent is extended or adjusted under 35 U.S.C. 154(b) by 102 days.

(21) Appl. No.: 16/048,151

(22) Filed: Jul. 27, 2018

(65) Prior Publication Data

US 2019/0227596 A1 Jul. 25, 2019

(30) Foreign Application Priority Data

Jan. 25, 2018 (KR) .......................... 10-2018-0009475

(51) Int. Cl.
*B32B 17/10* (2006.01)
*B32B 7/12* (2006.01)
*G06F 1/16* (2006.01)

(52) U.S. Cl.
CPC .............. *B32B 17/10* (2013.01); *B32B 7/12* (2013.01); *G06F 1/1633* (2013.01)

(58) Field of Classification Search
CPC .......... G06F 1/1633; B32B 7/12; B32B 17/10
See application file for complete search history.

(56) References Cited

U.S. PATENT DOCUMENTS

| 4,461,800 | A | * | 7/1984 | Tanaka | B30B 15/061 428/217 |
|---|---|---|---|---|---|
| 5,893,191 | A | * | 4/1999 | Schneider | B24D 13/145 15/230.12 |
| 6,413,889 | B1 | | 7/2002 | Best et al. | |
| 9,113,553 | B2 | | 8/2015 | An et al. | |
| 9,551,893 | B2 | | 1/2017 | An et al. | |
| 9,718,263 | B2 | | 8/2017 | Namkung et al. | |
| 10,031,360 | B2 | | 7/2018 | An et al. | |
| 10,207,483 | B2 | | 2/2019 | Son et al. | |
| 10,418,570 | B2 | | 9/2019 | Wang | |
| 2004/0055223 | A1 | * | 3/2004 | Ono | B24D 3/28 51/293 |
| 2005/0022682 | A1 | * | 2/2005 | Caron | B44B 5/026 101/32 |
| 2005/0112384 | A1 | * | 5/2005 | Bachmann | B30B 15/064 428/447 |

(Continued)

FOREIGN PATENT DOCUMENTS

CN 202085412 U 12/2011
CN 106466955 A 3/2017

(Continued)

OTHER PUBLICATIONS

ThermoFisher Scientific ,https://www.thermofisher.com/order/catalog/product/4333183#/4333183, 2016 (Year: 2016).*

(Continued)

*Primary Examiner* — Tong Guo
(74) *Attorney, Agent, or Firm* — Innovation Counsel LLP

(57) ABSTRACT

An exemplary embodiment of the present inventive concept provides a pad including: a flat portion; and corner portions, wherein the corner portions may be positioned at four corners of the pad, and hardness of the corner portions may be greater than that of the flat portion.

6 Claims, 16 Drawing Sheets

(56) References Cited

U.S. PATENT DOCUMENTS

| | | | | |
|---|---|---|---|---|
| 2005/0211113 A1* | 9/2005 | Caron | ....................... | B44C 5/00 |
| | | | | 101/32 |
| 2014/0002973 A1* | 1/2014 | Lee | .................... | H01L 51/5246 |
| | | | | 361/679.01 |
| 2016/0001536 A1* | 1/2016 | Ok | ........................ | B32B 37/003 |
| | | | | 156/256 |
| 2017/0121528 A1* | 5/2017 | Kim | ................... | C09D 151/003 |
| 2017/0283573 A1* | 10/2017 | Lee | ..................... | C08G 59/226 |
| 2018/0056638 A1* | 3/2018 | Choi | .................... | B30B 15/061 |

FOREIGN PATENT DOCUMENTS

| | | | |
|---|---|---|---|
| CN | 106774650 A | 5/2017 | |
| CN | 106920830 A | 7/2017 | |
| CN | 106976277 A | 7/2017 | |
| DE | 1957918 U | 3/1967 | |
| DE | 10236848 A1 * | 2/2004 | ............ F16L 13/141 |
| DE | 202007006849 U1 * | 6/2008 | ........... B30B 15/061 |
| EP | 1033237 A1 | 9/2000 | |
| EP | 1974896 A1 | 10/2008 | |
| GB | 1212591 A | 11/1970 | |
| KR | 10-0707391 B1 | 4/2007 | |
| KR | 10-1319543 B1 | 10/2013 | |
| KR | 10-1578442 B1 | 12/2015 | |
| KR | 10-2016-0044162 A | 4/2016 | |
| KR | 10-2017-0023267 A | 3/2017 | |
| KR | 10-2017-0091287 A | 8/2017 | |
| KR | 10-2017-0106550 A | 9/2017 | |
| KR | 10-1801559 B1 | 12/2017 | |

OTHER PUBLICATIONS

Chinese Office Action Report, Application No. 201910047065.4 dated Dec. 29, 2021, 14 pages.

* cited by examiner

PAD AND FILM ATTACHING METHOD USING THE SAME

CROSS-REFERENCE TO RELATED APPLICATION

This application claims priority to and the benefit of Korean Patent Application No. 10-2018-0009475 filed in the Korean Intellectual Property Office on Jan. 25, 2018, the entire contents of which are incorporated herein by reference.

BACKGROUND

(a) Technical Field

The present disclosure relates to a pad and a film attaching method using the same, and more particularly, to a pad having different hardnesses or thicknesses in different areas and to a film attaching method using the same.

(b) Description of the Related Art

Recently, a flexible display device having a light weight, strong impact resistance, and a flexible substrate made of a material such as plastic has been developed. The flexible display device may be folded or rolled to facilitate portability, and thus may be utilized in various fields.

The flexible display device includes display elements formed on a flexible substrate. The display elements that may be used for the flexible display device include an organic light emitting display element, a liquid crystal display element, and the like.

These display elements commonly include thin film transistors. Accordingly, the flexible substrate undergoes several thin film processes. After the thin film processes, the flexible substrate is sealed by an encapsulation layer. The flexible substrate, the thin film transistors formed on the flexible substrate, and the encapsulation layer form a display panel of the display device.

Generally, a cover window for protecting the display panel is attached to a front surface of the display panel. In this case, a bonding agent is interposed between the display panel and the cover window to bond the display panel and the cover window together.

In addition, recently, a side-view display device including a main display area in which a main image is displayed and an auxiliary display area in which a sub-image is displayed on a bent side has been developed. A cover window of the side-view display device has a side bending structure in which a side portion is bent. Bubble defects in which bubbles are interposed between the cover window and a film may occur during a process of attaching the film or the like to a rear surface of the cover window having the side bending structure.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a pad that may allow a film to be attached to a cover glass with multiple curvatures without lifting, and a film attaching method using the same.

An exemplary embodiment of the present inventive concept provides a pad including: a flat portion; and corner portions, wherein the corner portions may be positioned at four corners of the pad, and hardness of the corner portions may be greater than that of the flat portion.

The hardness is Shore Hardness. The Shore hardness of the corner portion may be 1.1 to 7 times greater than that of the flat portion.

The Shore Hardness of the flat portion may be 5 to 25.

The Shore Hardness of the corner portion may be 25 to 35.

Another exemplary embodiment of the present inventive concept provides a pad including: a flat portion; and corner portions, wherein the corner portions may be positioned at four corners of the pad, and the corner portions may protrude more than the flat portion.

A thickness of the corner portions may be 1.05 to 1.5 times greater than that of the flat portion.

Hardness of the corner portions may be greater than that of the flat portion.

Another embodiment of the present inventive concept provides a film attaching method, including: preparing a pad provided with a flat portion and a corner portion; sequentially positioning a film and a cover glass on the pad; and pressing the pad to attach the film to the cover glass, wherein hardness of the corner portion of the pad may be greater than that of the flat portion, or the corner portion of the pad may protrude more than the flat portion.

The hardness is Shore Hardness. The Shore hardness of the corner portion may be greater than that of the flat portion, and the shore hardness of the corner portion may be 1.1 to 7 times greater than that of the flat portion.

The Shore Hardness of the flat portion may be 5 to 25.

The Shore Hardness of the corner portion may be 25 to 35.

The corner portion may protrude more than the flat portion, and a thickness of the corner portion may be 1.05 to 1.5 times greater than that of the flat portion.

Four edges of the cover glass may not be parallel to the flat portion.

An angle at which one or more sides of the cover glass are bent may be 90 degrees or more with respect to an imaginary straight line perpendicular to the flat portion.

At least one corner portion of the cover glass may have multiple curvatures.

According to the exemplary embodiments, it is possible to provide a pad that may allow a film to be attached to a cover glass with multiple curvatures without lifting, and to a film attaching method using the same.

DETAILED DESCRIPTION OF THE EMBODIMENTS

Figure 1:
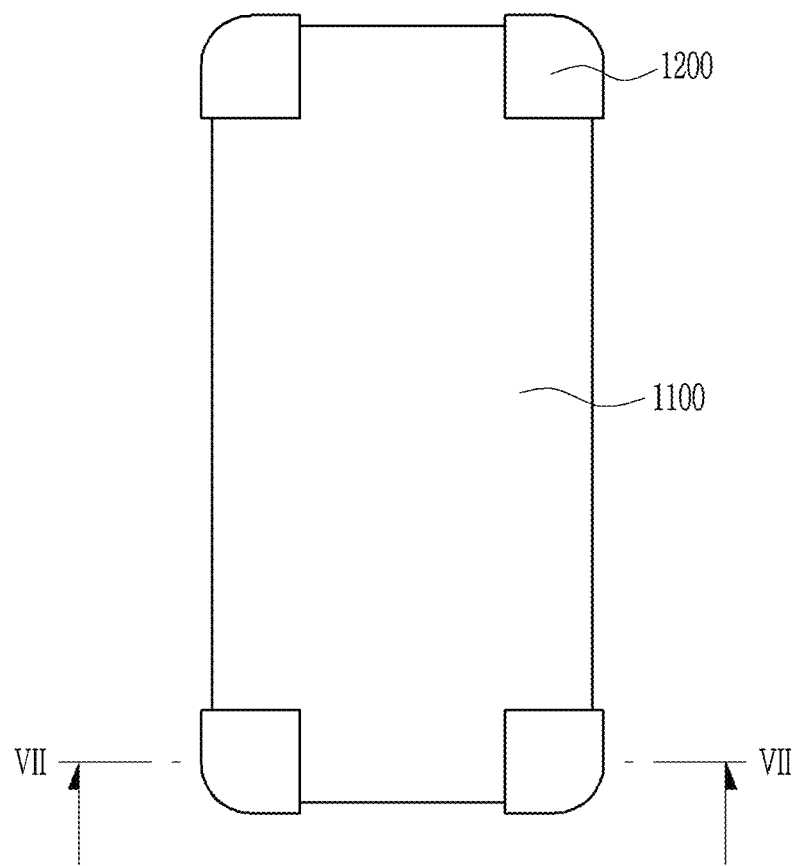
FIG. 1 illustrates a pad according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, areas, etc. are exaggerated for clarity. In the drawings, for ease of description, the thicknesses of some layers and areas are exaggerated.

It will be understood that when an element such as a layer, film, area, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

The present inventive concept relates to a method for attaching a film to a rear surface of a cover window and to a pad used in an attaching process, and more particularly, to a method for effectively attaching a film to a cover window of which all four sides are curved.

Hereinafter, a pad according to an exemplary embodiment of the present inventive concept will be described with reference to the accompanying drawings.

FIG. 1 illustrates a pad 1000 according to an exemplary embodiment of the present inventive concept.

Referring to FIG. 1, the pad 1000 according to the exemplary embodiment of the present inventive concept includes a flat portion 1100 and corner portions 1200 respectively positioned at corners of the pad.

In the present inventive concept, the pad 1000 is a structure used to attach a film or the like to a rear surface of a cover glass, and applies pressure to attach the film to the cover glass. A shape of the pad 1000 may be similar to that of the cover glass.

In the present exemplary embodiment, the flat portion 1100 and the corner portion 1200 of the pad 1000 may have different hardnesses. That is, the hardness of the corner portion 1200 may be greater than that of the flat portion 1100. For example, Shore Hardness of the corner portion may be 1.1 to 7 times greater than that of the flat portion. In addition, Shore Hardness difference between the flat portion 1100 and the corner portion 1200 may be about 10 to 30. For example, the Shore Hardness of the flat portion 1100 may be 5 to 25, and the Shore Hardness of the corner portion 1200 may be 25 to 35. The flat portion 1100 and the corner portion 1200 may contain different materials. As such, since the corner portion 1200 of the pad 1000 has relatively greater hardness, when pressure is applied to the entire pad 1000 to attach the film to the cover glass, stronger pressure may be applied to the film contacting the corner portion.

The Shore Hardness (Hs) is a hardness value measured by a Shore Hardness tester. The Shore Hardness tester is a dynamic hardness tester, which measures hardness as a height at which a scale weight with diamond collides with a specimen to bounce after dropping the scale weight from a predetermined height. The Shore Hardness $H_s$ is expressed as $H_s = 10000h/65h_0$, wherein h is a height of the scale weight that bounces, and $h_0$ is a height of the scale weight that drops.

When the film is attached to the rear surface of the cover glass of which sides are curved, compressive deformation and tensile deformation of the film occur during the attaching process. This deformation indispensably occurs in the process of attaching a flat film to a three-dimensional curved surface. This deformation is caused even when opposite edges of the cover glass are curved, but is more seriously caused when all four sides of the cover glass are curved. When all four sides of the cover glass are curved, it means that the four edges of the cover glass are not parallel to the flat portion.

Figure 2:
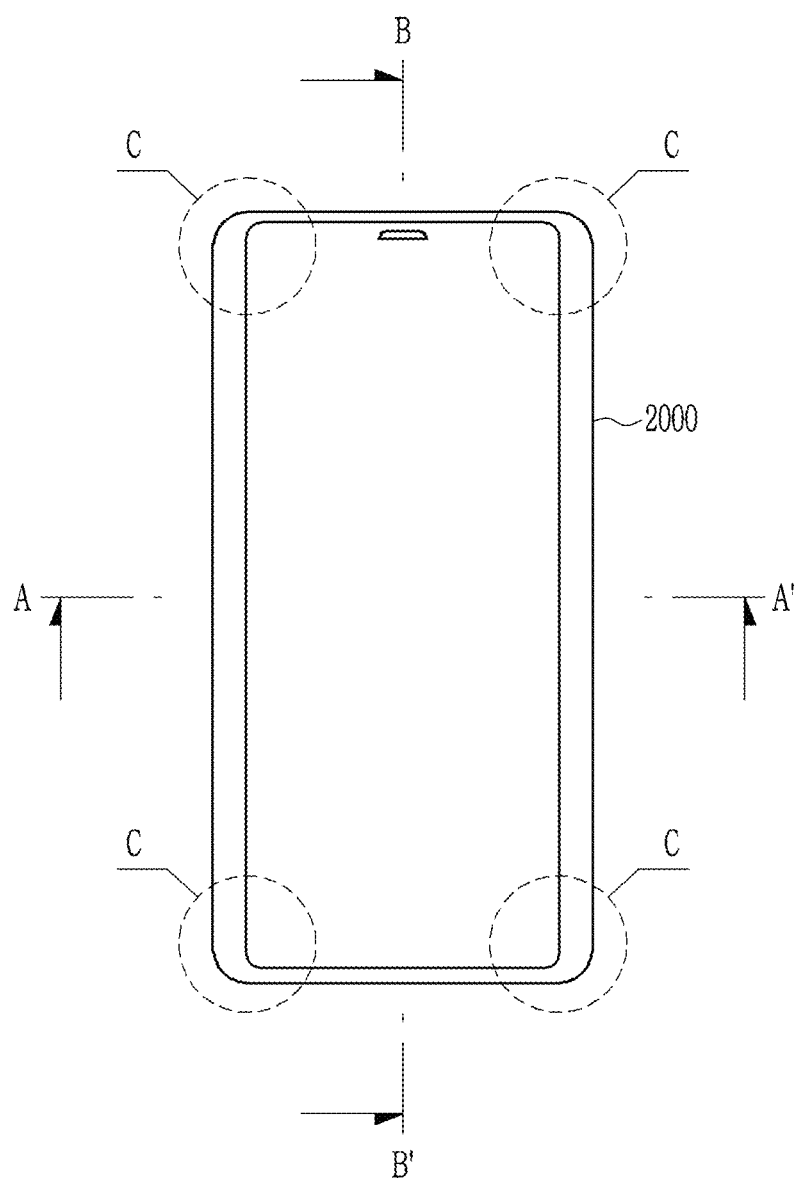
FIG. 2 illustrates a cover glass of which all four sides are curved according to an exemplary embodiment of the present inventive concept.
Figure 3:
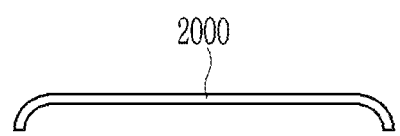
FIG. 3 illustrates a cross-sectional view taken along line A-A' of the cover glass of FIG. 2.

FIG. 2 illustrates a cover glass 2000 of which all four sides are curved according to an exemplary embodiment of the present inventive concept. Referring to FIG. 2, all four edges of the cover glass 2000 according to an exemplary embodiment of the present inventive concept are curved. FIG. 3 illustrates a cross-sectional view taken along line A-A' of the cover glass of FIG. 2, and FIG. 4 illustrates a cross-sectional view taken along line B-B' of the cover glass of FIG. 2.

Figure 4:
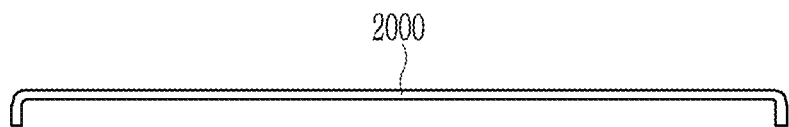
FIG. 4 illustrates a cross-sectional view taken along line B-B' of the cover glass of FIG. 2.

Referring to FIG. 2 to FIG. 4, it can be seen that the edges of the cover glass 2000 are bent. Referring to FIG. 3 and FIG. 4, in A-A' and B-B' cross-sections of FIG. 2, the bent angles at which the edges of the cover glasses are bent may be different from each other. That is, in the cross-section as shown in FIG. 3, the edge of the cover glass is gently bent, and in the cross-section as shown in FIG. 4, the edge of the cover glass may be steeply bent. However, the present inventive concept is not limited thereto, and in the A-A' cross-section, the edge of the cover glass may be steeply bent, and in the B-B' cross-section, the edge of the cover glass may be gently bent. Alternatively, in the A-A' and B-B' cross-sections, the edges of the cover glass may be bent to have the same angle.

Referring to FIG. 2, the areas indicated by C in the cover glass 2000 of FIG. 2 may have multiple curvatures. In the present specification, the multiple curvatures means that curvatures vary depending on positions. That is, the structure having the multiple curvatures is a structure in which multiple curvatures are included in one curved surface, and curvatures at respective corners are not the same and are varied. This is because the cover glass 2000 is bent not only in right and left sides, but in four sides. The multiple curvatures are caused at the four corners where the bending in the horizontal direction and the bending in the vertical direction meet.

In the exemplary embodiment, the edges in the left and right directions and the edges in the up and down directions of the cover glass 2000 may have the multiple curvatures. That is, the edges in the left and right directions may be bent with the multiple curvatures with respect to the flat portion, and the edges in the up and down directions may also be bent with the multiple curvatures with respect to the flat portion. In this case, since curvatures in different directions meet at the corner portions, different degrees of the curvatures may increase depending on the positions of the corner portions.

It is not easy to attach the film to the rear surface of the cover glass having such multiple curvatures. The film attached to the rear surface of the cover glass is a decoration film for defining the display area of the cover glass, which exposes the display area of the display device and covers the non-display area. Such a film has a two-dimensional structure, but the cover glass of which all four sides are bent has a three-dimensional structure, thus in a process of attaching the two-dimensional film to the three-dimensional cover glass, some areas of the film are compressed and some other areas thereof are stretched. In this case, the film is not attached well and air bubbles occur.

Figure 5:
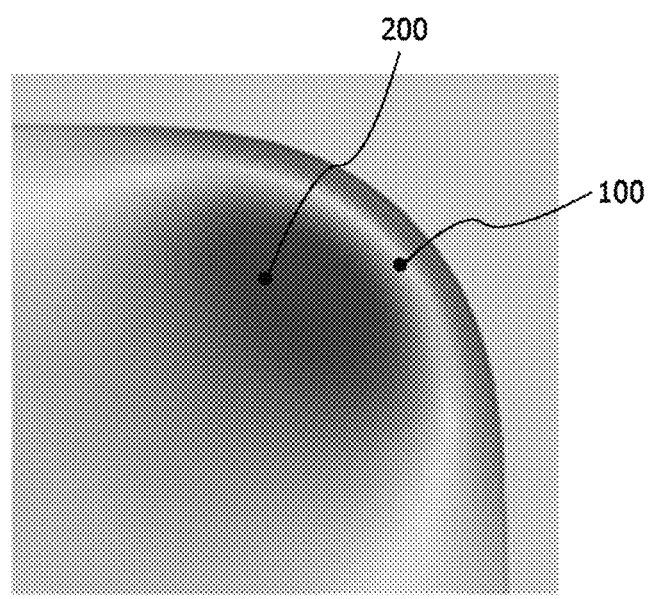
FIG. 5 illustrates deformation of a film which occurs during a process of attaching the film to a cover glass.

FIG. 5 illustrates deformation of a film which occurs during a process of attaching the film to a cover glass. Referring to FIG. 5, an edge area 100 is one in which compressive deformation occurs, and an inside area 200 disposed inside of the edge area 100 is one in which tensile deformation occurs. That is, it can be confirmed that different compressive/tensile stresses occur in respective areas of the film in the process of attaching the film to the cover glass.

In order to attach the film to the corners of the cover glass without bubbles, it is necessary to increase pressure applied to the pad while attaching the film, but when the pressure applied to the pad is increased, too strong pressure may be applied to a central portion of the film to cause leakage of an adhesive disposed between the film and the cover glass. In this case, when the pressure is increased so that the film is well-attached to the corners of the cover glass, the adhesive between the cover glass and the film leaks out, and when the pressure is decreased to a level from which the adhesive does not leak out, the film is not well-attached to the corners of the cover glass.

However, the pad according to the exemplary embodiment of the present inventive concept includes the flat portion 1100 and the corner portion 1200 having different hardnesses. That is, since the hardness of the corner portion 1200 is greater than the hardness of the flat portion 1100, a stronger pressure is applied to the corner portion 1200 even when the film is placed on the pad and attached to the cover glass with the same pressure.

Therefore, when the film is attached to the cover glass, it is possible to prevent the adhesive from leaking out due to the strong pressure in the planar area, and it is possible to prevent the bubbles from occurring as a result of the film not being adhered to the corners of the cover glass.

Figure 6:
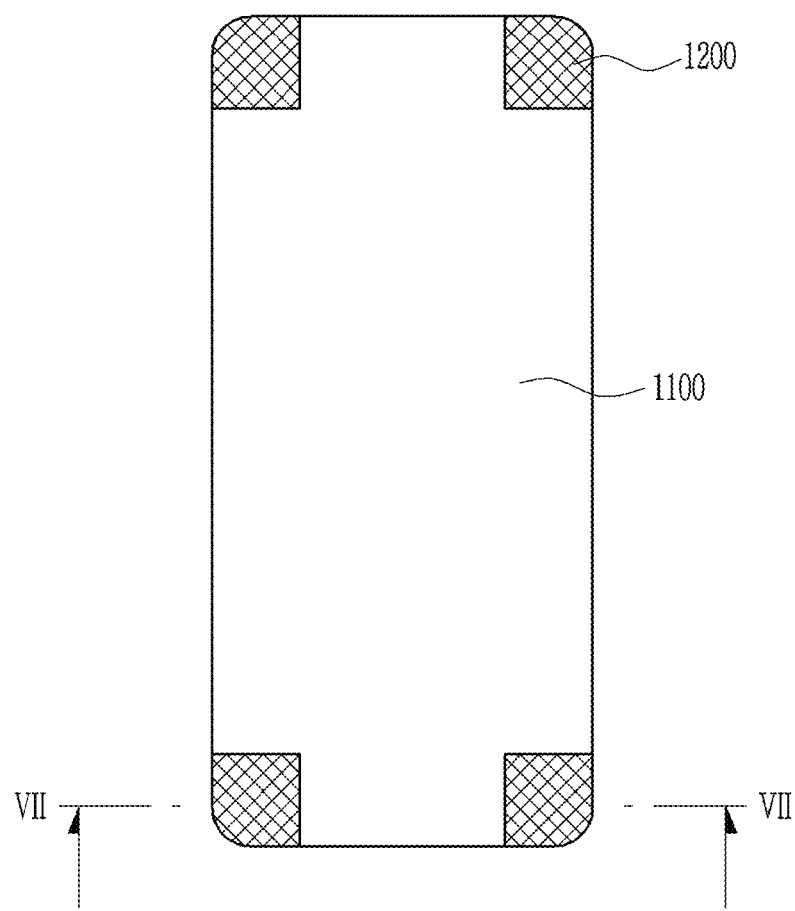
FIG. 6 illustrates a pad according to another exemplary embodiment of the present inventive concept.
Figure 7:
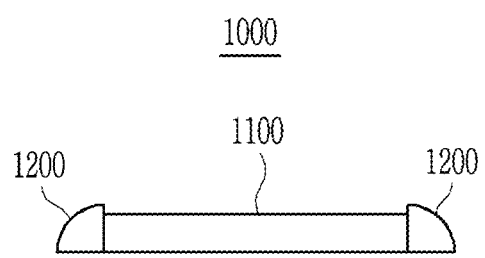
FIG. 7 illustrates a cross-sectional view taken along line VII-VII of the pad of FIG. 6.

FIG. 6 illustrates a pad 1000 according to another exemplary embodiment of the present inventive concept. FIG. 7 illustrates a cross-sectional view taken along line VII-VII of the pad of FIG. 6. Referring to FIG. 6 and FIG. 7, the pad 1000 according to the present exemplary embodiment is similar to the pad of FIG. 1 in that it includes a flat portion 1100 and corner portions 1200 respectively positioned at corners of the pad. However, a thickness of the corner portion 1200 of the pad 1000 according to the exemplary embodiment of FIG. 6 is thicker than that of the flat portion 1100. That is, the corner portion 1200 is protruded as compared with the flat portion 1100. For example, the thickness of the corner portion may be 1.05 to 1.5 times greater than that of the flat portion. Alternatively, a height difference between the flat portion 1100 and the corner portion 1200 may be 0.05 mm to 0.5 mm.

As such, when the corner portion 1200 is thicker than the flat portion 1100, even when the film is attached to the cover glass with the same pressure using the pad 1000, higher pressure is applied to the protruded corner portion 1200. Therefore, the film may be well-attached to the four corner portions at which it is difficult for the cover glass and the film to be attached to each other. In addition, since the height of the flat portion 1100 is lower than that of the corner portion 1200, lower pressure is applied to the flat portion 1100 than the corner portion 1200. Therefore, it is possible to prevent the adhesive between the cover glass and the film from leaking out.

Moreover, in the structure shown in FIG. 6, the hardness of the corner portion 1200 may be greater than that of the flat portion 1100. In this case, since the pressure increase due to the height difference of the corner portions 1200 and the pressure increase due to the greater hardness of the corner portions 1200 are summed, the film may be strongly attached to the corner portions of the cover glass.

That is, in the pad 1000 according to the exemplary embodiment of the present inventive concept, by forming the pad 1000 so that the hardness at the corner portion 1200 is greater than that of the flat portion 1100 or so that the thickness of the corner portion 1200 is greater than that of the flat portion 1100, the pressure applied to the flat portion 1100 and the corner portion 1200 of the pad may be made different. Even when the same pressure is applied to the pad 1000 having such a structure, higher pressure is applied to the corner portion 1200, and therefore, when the film is attached to the cover glass, the problem of the film not being adhered well to the corner of the cover glass may be prevented.

Hereinafter, a film attaching method according to an exemplary embodiment of the present inventive concept will be described.

FIG. 8 to FIG. 12 illustrate film attaching processes according to an exemplary embodiment of the present inventive concept.

Figure 8:
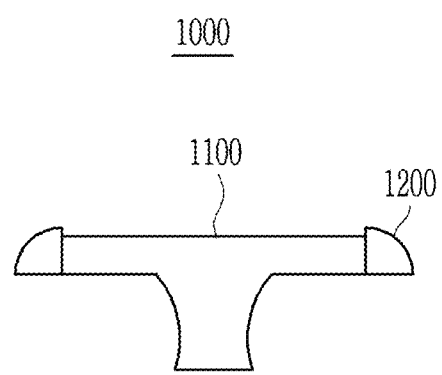
FIG. 8, FIG. 9, FIG. 10, FIG. 11, and FIG. 12 illustrate cross-sectional views of a film attaching process according to an exemplary embodiment of the present inventive concept.

Referring to FIG. 8, the pad 1000 is first prepared. As described above, the pad 1000 may be the pad having the structure shown in FIG. 1 or FIG. 5. When the pad 1000 has the structure shown in FIG. 1, the hardness of the corner portion 1200 is greater than that of the flat portion 1100, and when the pad 1000 has the structure shown in FIG. 5, the thickness of the corner portion 1200 is greater than that of the flat portion 1100. Although the case in which the pad has the structure of FIG. 1 is exemplarily described in the present exemplary embodiment, the present inventive concept is equally applicable to the case in which the pad has the structure of FIG. 5.

Figure 9:
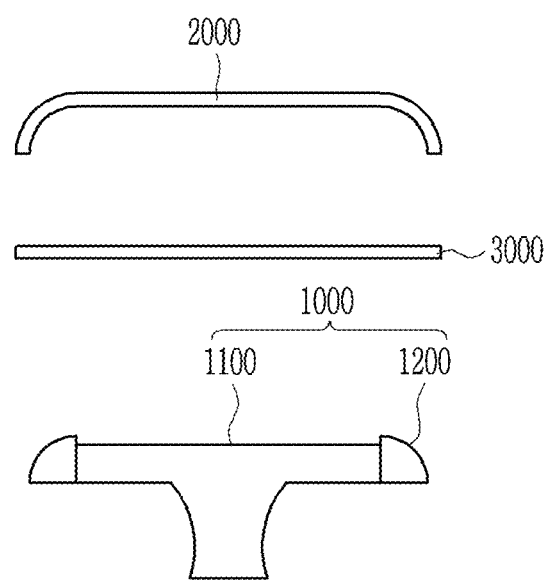

Referring to FIG. 9, the cover glass 2000 is disposed on the pad 1000, and a film 3000 is disposed between the cover glass 2000 and the pad 1000. Only the cover glass 2000 is shown in FIG. 8, but the cover glass 2000 may be fixed and supported by another structure. The cover glass 2000 may have a curved surface of which all four sides are bent. That is, the cover glass 2000 may have the structure shown in FIG. 2. As such, four corners of the cover glass 2000 of which all four edges are bent, as shown in FIG. 2, have multiple curvatures.

Figure 10:
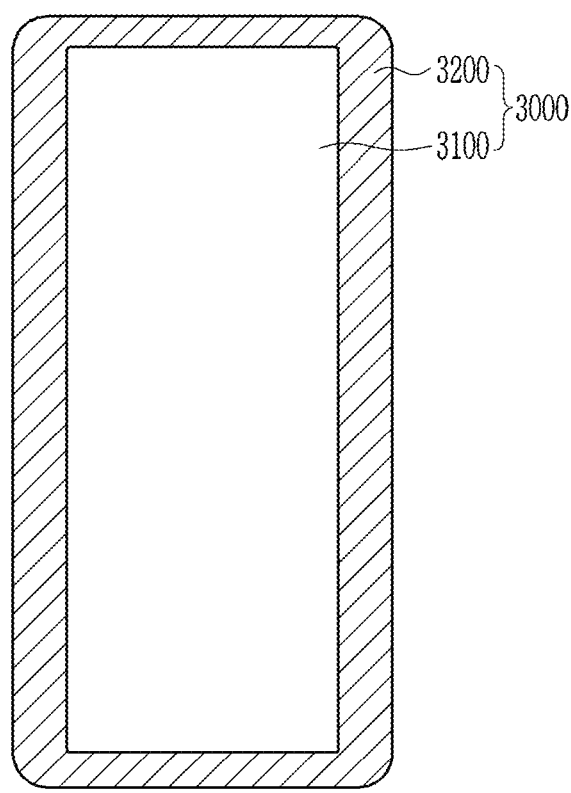

The film 3000 may be a film which defines a display area and a non-display area of the display device. FIG. 10 illustrates a film 3000 according to an exemplary embodiment of the present inventive concept. Referring to FIG. 10, the film 3000 includes a display area 3100 and a non-display area 3200.

Figure 11:
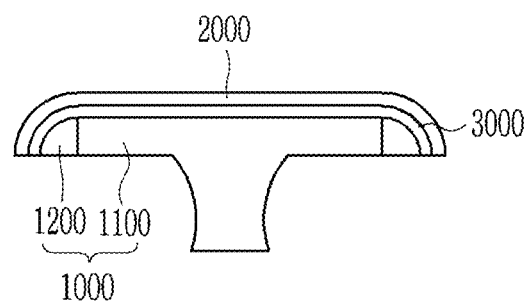

Referring to FIG. 11, the film 3000 is attached to the rear surface of the cover glass 2000 using the pad 1000. Although not shown, the adhesive may be disposed between the rear surface of the cover glass 2000 and the film 3000.

The pad 1000 is gradually pressed and inflated from a center thereof such that the film 3000 may be attached to the rear surface of the cover glass 2000. In this case, since the pad 1000 has the structure shown in FIG. 1 or FIG. 5, the pad 1000 applies a high pressure to an area corresponding to the corner portion 1200 of the pad 1000. Therefore, the film may be well-attached to the four corners of the cover glass 2000 having the multiple curvatures without lifting.

Figure 12:
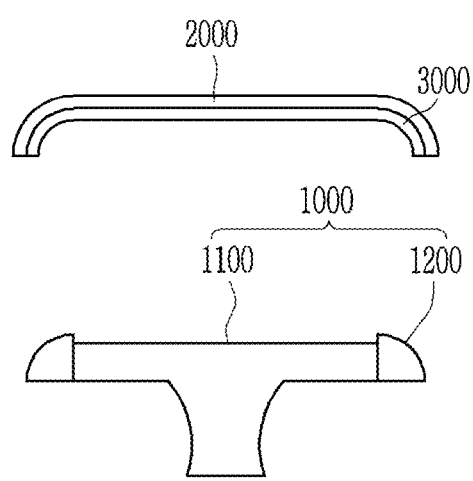

Next, referring to FIG. 12, the pad 1000 is removed. The pad 1000 may be removed by reducing the pressure in the inflated pad 1000 to reduce the volume thereof.

Figure 13:
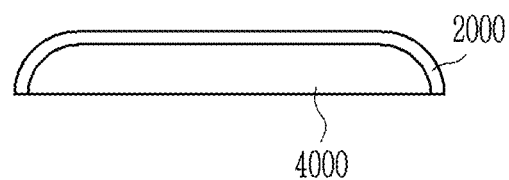
FIG. 13 illustrates a display device according to an exemplary embodiment of the present inventive concept.

Hereinafter, a display device according to an exemplary embodiment of the present inventive concept will be described. FIG. 13 illustrates a display device according to an exemplary embodiment of the present inventive concept. Referring to FIG. 13, the display device according to the exemplary embodiment of the present inventive concept includes a display panel 4000 and the cover glass 2000 positioned on the display panel.

Figure 14:
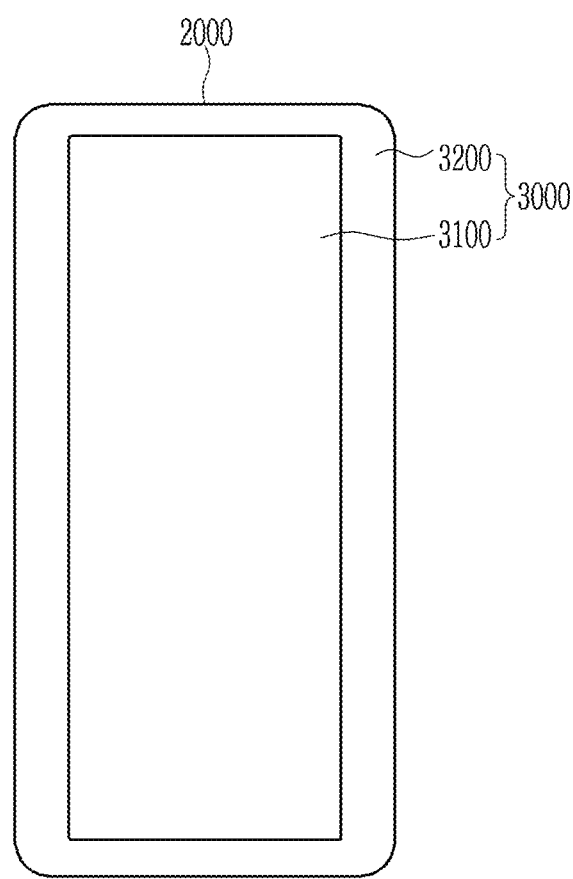
FIG. 14 illustrates only a cover glass in a display device according to an exemplary embodiment of the present inventive concept.

FIG. 14 illustrates only the cover glass 2000. Referring to FIG. 14, the film 3000 is attached to the rear surface of the cover glass 2000. The film 3000 includes the display area 3100 and the non-display area 3200, and the display area 3100 corresponds to an opening of the film 3000.

Figure 15:
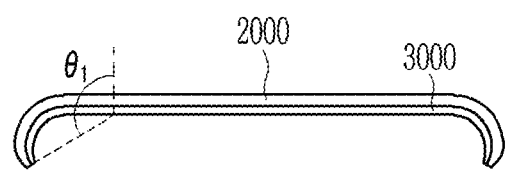
FIG. 15 illustrates a cross-sectional view of the cover glass of FIG. 14 in a first direction.
Figure 16:
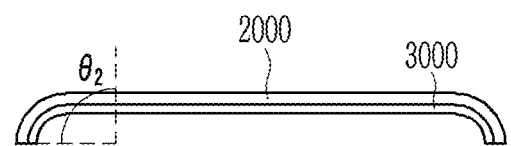
FIG. 16 illustrates a cross-sectional view of the cover glass of FIG. 14 in a second direction.

FIG. 15 illustrates a cross-sectional view of the cover glass of FIG. 14 in a first direction. FIG. 16 illustrates a cross-sectional view of the cover glass of FIG. 14 in a second direction.

Referring to FIG. 15 and FIG. 16, the cover glass according to the exemplary embodiment of the present inventive concept includes the curved surface of which all four sides are bent. That is, the edges of the cover glass are bent in four directions, respectively.

Referring to FIG. 15, the cover glass may have a bent angle ($\theta_1$) of more than 90 degrees. That is, as shown in FIG. 15, the angle ($\theta_1$) formed by one edge of the cover glass with respect to an imaginary vertical line perpendicular to the flat portion of the cover glass may be 90 degrees or more. It is not easy to attach the film to the rear surface of the cover glass in which the edge is bent at 90 degrees or more. However, when the pad 1000 according to the exemplary embodiment of the present inventive concept and the film attaching method using the pad 1000 are used, the film may be well-attached even to the corner of the cover glass having the multiple curvatures.

Referring to FIGS. 15 and 16, the angle ($\theta_1$) at which the cover glass is bent in a first direction and the angle ($\theta_2$) at which the cover glass is bent in a second direction may be the same or different from each other. However, at least one of the first direction and the second direction may include an obtuse angle curved surface.

As described above, in the pad 1000 according to the exemplary embodiment of the present inventive concept, by forming the pad 1000 so that the hardness of the corner portion 1200 is greater than that of the flat portion 1100 or so that the thickness of the corner portion 1200 is greater than that of the flat portion 1100, the pressure applied to the flat portion 1100 and the corner portion 1200 of the pad may be made different. Therefore, the film 3000 may be well-attached to the corners of the cover glass 2000 having the multiple curvatures without lifting and without causing the adhesive to leak out.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A pad comprising:
a flat portion;
curved portions disposed at edges of the pad; and
corner portions disposed at corners of the pad in regions corresponding to the curved portions in a plan view,
wherein hardness of the corner portions is greater than that of the flat portion and all the curved portions other than the corner portions, and each corner is spaced apart from each other,
wherein the hardness of the corner portion is 1.1 to 7 times greater than that of the flat portion, and the corner portions and the flat portion comprise different materials, and
wherein an edge of the curved portions and an edge of the corner portions coincide with each other.

2. The pad of claim 1, wherein
the hardness is Shore Hardness.

3. The pad of claim 2, wherein
the Shore Hardness of the flat portion is 5 to 25.

4. The pad of claim 2, wherein
the Shore Hardness of the corner portion is 25 to 35.

5. A pad comprising:
a flat portion;
curved portions disposed at edges of the pad; and
corner portions disposed at corners of the pad in regions corresponding to the curved portions in a plan view,
wherein the corner portions protrude more than the flat portion and all the curved portions other than the corner portions, and each corner is spaced apart from each other,
wherein a thickness of the corner portions is 1.05 to 1.5 times greater than that of the flat portion and a height difference between the flat portion and the corner portion is 0.05 mm to 0.5 mm, and
wherein an edge of the curved portions and an edge of the corner portions coincide with each other.

6. The pad of claim 5, wherein
hardness of the corner portion is greater than that of the flat portion.

* * * * *